Dec. 19, 1967

E. S. TAMM 3,359,475

CONTROL SWITCH CIRCUIT FOR DE-ENERGIZING THE
STARTING CIRCUIT OF AN ELECTRICAL MOTOR

Filed Oct. 13, 1965

INVENTOR
EMIL S. TAMM
BY
ATTORNEY

United States Patent Office

3,359,475
Patented Dec. 19, 1967

3,359,475
CONTROL SWITCH CIRCUIT FOR DE-ENERGIZING THE STARTING CIRCUIT OF AN ELECTRICAL MOTOR
Emil S. Tamm, Fort Smith, Ark., assignor to Baldor Electric Company, Fort Smith, Ark., a corporation of Missouri
Filed Oct. 13, 1965, Ser. No. 495,496
4 Claims. (Cl. 318—221)

ABSTRACT OF THE DISCLOSURE

A control switch circuit for de-energizing the starting circuit of an electrical motor having a relay winding connected in series within the primary winding circuit of the motor, and a relay switch disposed in series with a centrifugal switch and being series connected within either the auxiliary or start windings circuits. When the motor is de-energized the relay switch breaks contact thereby preventing the conduction of any electrical charge through the auxiliary or start windings circuit, respectively.

---

This invention relates in general to electrical motor control, and more particularly, pertains to an electromagnetic control circuit as used in conjunction with an alternating current motor.

It is an object of this invention to provide a control circuit which is incorporated within the circuit of an electrical motor to therein prevent the development of harmful vibrations as are normally effected within a single phase alternating current type motor when the motor is decelerating in revolutions during its slowdown after being turned to the "off" position.

It has long been a problem to electrical motor manufacturers to eliminate the shaking and vibratory effects that are caused in small alternating current, capacitor type motors such as when the electric charge has been shut off for terminating operation of the said motors. Such motors frequently find their usefulness in providing power to smaller machines and hand powered tools upon the power supplied from a source of single phase type of alternating current. Since the motors usually operate on this type current, they are ordinarily of the capacitor-start and capacitor-run category of electrical motors which necessarily require enchanced power during the build up and running stages of their operation. It has been found, though, that immediately after the operator ceases to make use of a machine or tool operating under the power of such a motor and turns the motor switch to the "off" position, frequently during motor deceleration a back voltage is induced and is developed between the revolving rotor core and the motor stator windings which produces a needless and harmful vibrating effect to the machine or tool proper. These vibrations, as caused, are not only a source of irritation to the particular party utilizing and working with said machine or tool, but the vibrations are of such a frequency and magnitude that they provide a rhythmic shaking and jarring which causes a loosening of the various components and elements comprising the motor, machine or tool and thereby expedites deterioration. By simply incorporating the novel control circuit of this invention within a motor used for the purposes as previously mentioned, this undesirable reaction heretofore inherent in the operation of the aforementioned machines and tools may be totally eliminated.

It is, therefore, another object of this invention to provide an electrical motor control which will act in conjunction with a motor circuit to eliminate any undesirable malfunctioning which presently exists in an alternating current capacitor motor, the faulty performance being evidenced in the nature of vibrations which build up and shake the motor and associated mechanical parts as it commences to decelerate after shut down.

It is a further object of this invention to provide an electrical motor control which may be easily incorporated to act in conjunction with the normal circuit of an alternating current motor without affecting the motor's uniform outward appearance, or necessitating the addition of any bulky components to the existing structural composition of said motor.

It is yet a further object of this invention to provide an electrical motor control which functions inherently within the circuit operation of the motor, and without necessitating the participation of any manual force exerted on the part of its operator, to eliminate the annoying physical quivering and vibrating motion that is associated with the deceleration of the motor after it is turned to the "off" position.

Other objects and advantages of this invention will become apparent from the following description when read in conjunction with the accompanying drawings, in which.

Figure 1:
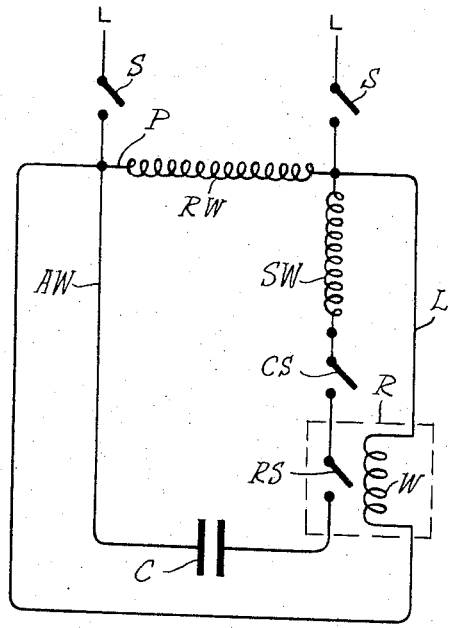
FIGURE 1 is a circuit diagram illustrating the electrical motor control as incorporated within the circuitry of a capacitor-start motor.

Referring now by reference characters to the drawings, in FIGURE 1, there is illustrated a circuit diagram for an alternating current electrical motor which operates from a common single phase line current supplied from any alternating current source to the electrical motor by means of circuit lines L. Switch S is normally connected in series with the forementioned lines, and is provided for being actuated into an "on" current conducting or "off" nonconducting position and thereby furnishing a means for controlling the operation of the electrical motor as desired by the operator. Lines L are additionally connected to the primary windings circuit P and auxiliary windings circuit AW of the stator assembly of the electrical motor and are so disposed integrally within the motor construction so as to supply the power necessary to provide the operation of the electrical motor. Naturally, provided within the primary windings circuit P of the electrical motor are a series of run windings RW which function to provide the dominant force necessary for continuous operation of the motor while it is maintained "on" and in working condition.

Since the motor functions to operate as a capacitor-start motor, there are provided within the auxiliary windings circuit AW a series of start windings SW. These start windings are further connected in series to a common centrifugal switch CS which is utilized for maintaining the auxiliary windings circuit in operation at the start of the operation of the motor while it is accelerating during power build up after it has been actuated into the "on" position. Such a centrifugal switch ordinarily retains the auxiliary windings circuit within operation in the motor to assist in its acceleration until the revolutions or performance of the motor reaches a predetermined efficiency, at which time said switch will operate under the exertion of centrifugal pressure to break contact and thereby eliminate the functioning of the start windings of the stator circuit in assisting in the operation of the motor. Further provided in series within the auxiliary windings circuit of the motor is a capacitor C which may be of the electrolytic type, or any other type capacitor which is commonly used by the industry in capacitor-start motors.

This capacitor C functions to shift the charge or current traversing the auxiliary windings circuit slightly out of phase to lead the current that is traversing the primary windings circuit, and thus provides an additional boost of electromotive force that assists in the power build up of the motor as when it is first turned on for operation. Bridging the circuit lines L and the auxiliary windings circuit AW is an electrically operated relay R comprising a relay winding W which is inserted in series within the circuit lines. This winding W is disposed within the relay for acting upon by means of magnetic attraction the integral relay switch RS which is connected in series within the auxiliary windings circuit. Relay R is energized by the charge normally conducted through circuit lines L, as when switch S is closed for operation of the motor, and thereby acts upon the winding W for closing the relay switch RS for maintaining the auxiliary windings circuit in operation within the motor circuit. When the switch S is turned off and ends the functioning of said electrical motor, the relay switch will break contact and thereby eliminate the auxiliary windings circuit from acting within the motor circuit.

In operation, it has been found that when the electrical motor is rendered inoperative as when turned off, the rotor core element, not shown, of said motor commences to decelerate for slow down to a stand still. During this process it has been discovered that a remanent magnetic force is developed in the rotor core which thereby imparts or induces a back potential within the primary windings circuit P and circuit lines L of the stator element of the motor. As the motor decreases in its speed of revolutions down to a precalculated point of efficiency, the centrifugal switch CS again re-engages into contact and thereby inserts the auxiliary windings circuit AW back into circuit contact within the stator element of the motor. The back potential that has developed within the primary windings circuit and circuit lines incites the conduction of a resultant current within the auxiliary windings circuit, which charge tends to build up against the capacitor C and therein develop undesirable oscillations which impart a vibratory type shaking movement to the over-all motor structure. By incorporating relay R into the line and auxiliary windings circuits of the stator circuit, as the line current to the motor is turned off thereby curtailing the transfer of any line charge into the motor circuit, the winding W will cease to be energized and thereby provide for the opening of relay switch RS, rendering the auxiliary windings circuit nonconductive. As a result, the back potential that has been created between the motor rotor and the stator elements of the motor will not be able to induce the transfer of any charge within the auxiliary windings circuit, thereby precluding the build up of any charge around the capacitor C. Therefore, the undesirable oscillatory movement of current around capacitor C is eliminated. Hence, the heretofore annoying vibrations will no longer be present and the motor will uninterruptedly decrease in speed during its slow down after it has been turned off. The motor, when it incorporates the unique and novel motor control of this invention, may have a prolonged useful life, and its deterioration will not be quickened by the rhythmic jarring or shaking that had heretofore disrupted its smooth operation as when it was included in any electrical machine or power tool.

Figure 2:
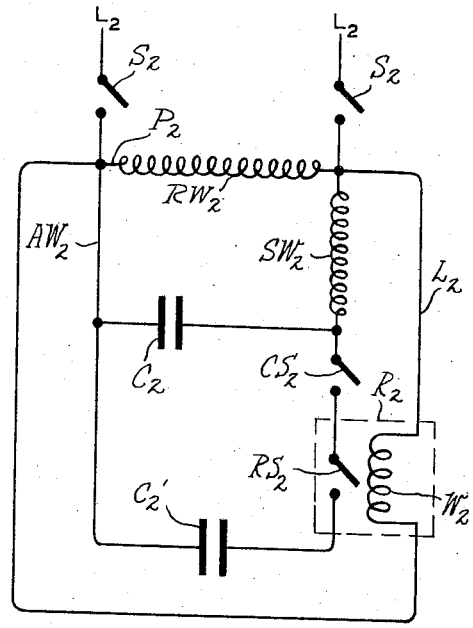
FIGURE 2 is a circuit diagram illustrating the electrical motor control as incorporated within the circuitry of a capacitor-start, capacitor-run motor.

In FIGURE 2, there is disclosed a further modification of this invention as incorporated within a common capacitor-start, capacitor-run electrical motor. Such a motor normally operates upon power supplied from a common source of single phase alternating current which is conveyed to said motor by means of circuit lines $L_2$. A common electrical switch $S_2$ is connected to the motor and retained in series with the circuit lines so as to provide means for actuating into a start or stop position the operation of the motor. These circuit lines are further connected to a primary windings circuit $P_2$ which contains the run windings $RW_2$ that normally function to provide the necessary induced force for the continued operation of the motor as when it is turned on and running. Further provided within the circuitry of the electrical motor is auxiliary windings circuit $AW_2$ which contains in series start-run windings $SW_2$ and a common run capacitor $C_2$ which is included within the circuit to provide a slight shift in phase so that the charge traversing the auxiliary windings circuit will slightly lead the charge conveyed through the primary windings circuit. Thus, in the operation of the motor, the start-run windings $SW_2$ acting in conjunction with the performance of the run capacitor $C_2$ will continue to provide assistance to the run windings $RW_2$ in providing a form of a dual motor torque that furnishes a sustained and efficient continued operation of the motor. This use of auxiliary windings in association with the run windings provides a form of split phase operation to the stator element of the electrical motor which further enhances its operational power and effectiveness.

Connected in parallel to run-capacitor $C_2$ within auxiliary windings circuit $AW_2$ is a starting capacitor $C_2'$ which provides for an additional phase shifting of electrical chanrge traversing within this portion of the circuit, and thereby further supplies an additional accelerational force to the operation of the motor during its initial power build up after it has been first turned to the "on" position. A common centrifugal switch $CS_2$ is joined in series with the starting capacitor and is disposed for opening this portion of the auxiliary windings circuit after the motor has built up a certain speed of operation, and thereby, eliminate a further functioning of said capacitor during normal continued running of the motor.

Connected between the circuit lines $L_2$ and the auxiliary windings circuit $AW_2$ is an electromagnetic relay $R_2$ which is comprised of a common relay winding $W_2$ being attached within the line circuit, and further includes a magnetically actuated relay switch $RS_2$ which is connected in series with the starting capacitor $C_2'$ of the auxiliary windings circuit.

The operation of the electrical motor control within the common capacitor-start, capacitor-run motor circuit, as revealed in FIGURE 2, is very similar to the operation of the electrical motor control previously described and as revealed in FIGURE 1. When it is desired to use this type motor in any given form of machinery or tool, the operator need simply close switch $S_2$ which thereby energizes the motor into initial operation. Electric current passes through the run windings $RW_2$ and the parallel start-run windings $SW_2$. By including a run-capacitor $C_2$ and a start-capacitor $C_2'$ within the circuit, the charge passing through the start-run windings will be shifted out of phase to lead that current which traverses through the run windings, thereby providing for a multiphase type of motor which is essential to start and retain in operation a capacitor-start, capacitor-run single phase motor. Immediately as switch $S_2$ is closed and conveys current to the motor, said current will energize the windings $W_2$ of the relay $R_2$ which thereby creates an electromagnetic force for acting upon and closing into circuit contact the relay switch $RS_2$. This relay switch is normally biased into an open, circuit breaking position within the auxiliary windings $AW_2$ while switch $S_2$ is open, but is forced into contact when the windings $W_2$ are energized by the electrical charge conveyed through the circuit lines $L_2$ after said switch $S_2$ is closed. After the motor builds up to a predetermined operating efficiency, the centrifugal forces acting upon switch $CS_2$ will force a break in its contact and thereby totally eliminate the effectiveness of the starting capacitor within the circuit. Once the starting capacitor has been removed from operation within the circuit, the motor will continue to function by means of the force created and exerted by the run windings, and also by the slightly out-of-phase electromotive force that is developed in the start-run windings by means of the function of run capacitor $C_2$. When it is desired to prevent a further operation of the electrical motor, the operator need simply to disengage from contact the switch $S_2$ which thereby eliminates any external charge from exciting the motor. As the motor decreases in speed, and decelerates to a predetermined efficiency, the centrifugal switch will once again engage in contact and thereby reinsert start-capacitor $C_2'$ within the auxiliary windings circuit. As previously discussed, it has been found that there is a magnetic force that develops within the decelerating rotor core of the motor which tends to produce a back potentail within the primary windings circuit $P_2$ and circuit lines $L_2$. Naturally, this back potential creates a charge that is further conducted into the auxiliary windings circuit $AW_2$, and detrimentally effects the build up of an oscillating type charge around the start-capacitor $C_2'$ resulting in the creation of a vibrating type shock which jars the entire motor structure until deceleration has been totally concluded. By including the novel relay $R_2$ of this invention within the circuitry of the motor stator, when switch $S_2$ has broken in contact for preventing any further operation of the motor, electrical charge will no longer be conducted through circuit lines $L_2$ for acting upon the windings $W_2$ of the relay $R_2$. As a result, no electromagnetic force will be exerted by the windings $W_2$ for retaining its integral relay switch $RS_2$ in circuit contact within the auxiliary windings circuit $AW_2$. Hence, when switch $S_2$ is open, relay switch $RS_2$ will also be biased open for providing a break in the circuitry of the auxiliary windings circuit $AW_2$, and no charge will be conducted therein. Due to this break in contact by the relay switch, the charge produced by the back potential will not be conducted to and affect the starting capacitor $C_2'$ of the motor, and therefore, no resulting unfavorable vibrations will be produced in the electrical motor or within the mechanical device in which it is incorporated.

Figure 3:
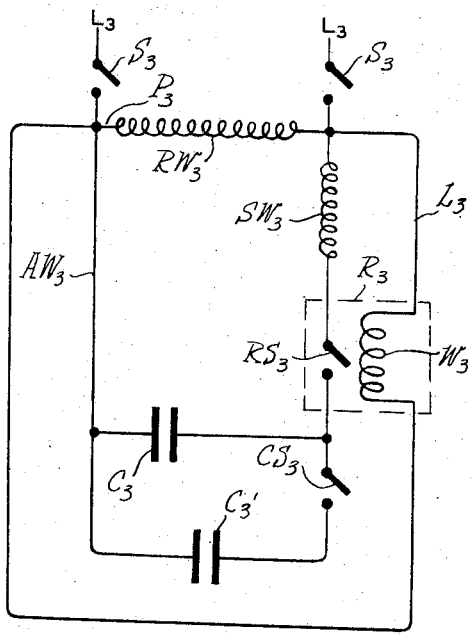
FIGURE 3 is a modified circuit diagram illustrating the electrical motor control as incorporated within the circuitry of a capacitor-start, capacitor-run motor.

Disclosed in FIGURE 3 is a further slight modification of the capacitor-start, capacitor-run electrical motor incorporating a novel control circuit of this invention. Current for energizing the motor is conveyed through circuit lines $L_3$ and the control of the conveyance of said charge is provided by a switch $S_3$. The stator circuit of the electrical motor contains a primary windings circuit $P_3$ having run windings $RW_3$, and further contained therein is an auxiliary windings circuit $AW_3$ which has a start-run windings $SW_3$. Further provided within the auxiliary windings circuit is a run capacitor $C_3$ and a starting capacitor $C_3'$ which is disposed in parallel relationship to said run capacitor. A centrifugal switch $CS_3$ is provided in series with said starting capacitor and is capable of breaking circuit contact for eliminating the functioning of the starting capacitor when the electrical motor reaches a predetermined efficiency of operation after it has first been turned to the "on" position. A common relay $R_3$ has a series of relay windings $W_3$ which is connected within the circuit lines $L_3$, and further contains an integral relay switch $RS_3$ which is attached within the auxiliary windings circuit. This capacitor motor when in operation performs similarly to such electrical motors as previously discussed in this application, and when said motor is shut off from operation, it has been found that a magnetic force is developed in the decelerating rotor core which creates a back potential and resulting charge which pervades throughout the primary and auxiliary windings circuits and circuit lines. With the inclusion of the relay $R_3$ within the auxiliary windings circuit and circuit lines, as the switch $S_3$ is broken in contact to prevent a further operation of the motor, no further line charge will be conveyed for energizing the windings $W_3$. As a result, the relay switch will break in contact within the auxiliary windings circuit, and thereby prevent any further conduction of charge within said circuit. This breaking of contact within the auxiliary windings circuit thereby prevents the conductivity of any charge through the same which eliminates the oscillatory build up of charge around the capacitors $C_3$ and $C_3'$. Hence, the unnecessary vibrations that resulted from the oscillation of electric charge around the aforementioned capacitors is eliminated.

It is conceivable that the windings of the relay as utilized in this invention might be connected within the primary windings circuit, and therein to be energized or de-energized for closing or opening the contact of its integral relay switch. Furthermore, it is within the scope of this invention that a fragment of the electromagnetic force that is produced within the run windings of the primary windings circuit might be diverted to actuate the relay switch which is contained within the auxiliary windings circuit of the electrical motor. When the motor switch is turned on to provide for the conveyance of charge for operation of the motor, the energizing of the run windings will close the relay switch of the relay for providing circuit connection and operation of the auxiliary windings circuit. Likewise, when the motor switch is opened for preventing a further operation of the electrical motor, the de-energizing of the run windings will allow the biased relay switch to be opened for breaking the circuit contact of the auxiliary windings circuit and prevent any further conduction of electric charge through said circuit.

It is to be understood that the above described circuit arrangements are merely illustrative of the principles of the invention, and other arrangements and modifications may be devised by those skilled in the art without departing from the spirit and scope of the invention.

Having thus described the invention, what is claimed and desired to be secured by Letters Patent is:

1. An electrical motor control for use in conjunction with a single phase alternating current motor having circuit lines and a stator circuit, a primary windings circuit contained in said stator circuit, an auxiliary windings circuit contained in said stator circuit and connected in parallel to said primary windings circuit, a centrifugal switch series connected in said auxiliary windings circuit, a capacitor series connected in said auxiliary windings circuit, a relay switch series connected in said auxiliary windings circuit, relay windings series connected in said circuit lines, said relay switch being responsive to the energizing of said relay windings, and means for de-energizing said relay windings for opening said responsive relay switch at a time prior to or simultaneously with the closing of said centrifugal switch thereby rendering said auxiliary windings circuit and series capacitor inoperative while said motor decelerates after being shutoff.

2. An electrical motor control for use in conjunction with a single phase alternating current motor having circuit lines and a stator circuit, a primary windings circuit contained in said stator circuit, an auxiliary windings circuit contained in said stator circuit, a run capacitor and a start capacitor connected in said auxiliary windings circuit, a relay switch series connected to said start capacitor in said auxiliary windings circuit, a centrifugal switch series connected to said relay switch, relay windings connected in said circuit lines, said relay switch being responsive to the energization of said relay windings, and means for de-energizing said relay windings for opening said responsive relay switch at a time prior to or simultaneously with the closing of said centrifugal switch thereby rendering said start capacitor inoperative while said motor decelerates after being shutoff.

3. An electrical motor control for use in conjunction with a single phase alternating current motor having circuit lines and a stator circuit, a primary windings circuit contained in said stator circuit, an auxiliary windings circuit contained in said stator circuit and connected in parallel to said primary windings circuit, a switch connected in said circuit lines and when closed providing for passage of current for operation of said motor or when opened preventing an operation of said motor, a relay switch connected in said auxiliary windings circuit, a centrifugal switch series connected in said auxiliary windings circuit, relay windings connected in said circuit lines, said relay switch being responsive to the energization of said relay windings, said relay windings being energized when said switch is in closed current passing contact thereby actuating said responsive relay switch into closed contact, and said relay windings being de-energized when said switch is opened thereby opening said responsive relay switch prior to or simultaneously with the closing of said centrifugal switch thereby rendering said auxiliary windings circuit nonconductive while said motor decelerates after being shutoff.

4. An electrical motor control for use in conjunction with a single phase alternating current motor having a stator circuit, a primary windings circuit contained in said stator circuit, an auxiliary windings circuit contained in said stator circuit and connected in parallel to said primary windings circuit, run windings connected in said primary windings circuit, a relay switch connected in said auxiliary windings circuit, a centrifugal switch series connected in said auxiliary windings circuit, said relay switch being responsive to said run windings, and means for de-energizing said run windings for opening said responsive relay switch prior to or simultaneously with the closing of said centrifugal switch thereby rendering said auxiliary windings circuit nonconductive while said motor decelerates after being shutoff.

References Cited

UNITED STATES PATENTS

| 1,921,204 | 8/1933 | Nickle | 318—221 |
| 3,020,464 | 2/1962 | Gerteis | 318—221 |

ORIS L. RADER, *Primary Examiner.*

G. Z. RUBINSON, *Assistant Examiner.*